July 18, 1961  H. R. DUTTON ET AL  2,992,476
MEANS FOR MOUNTING RESILIENT ANNULAR MEMBERS
Filed Nov. 22, 1957  2 Sheets-Sheet 1

INVENTORS
Harold R. Dutton
BY William G. Schwallie
John A. Marvin
THEIR ATTORNEY

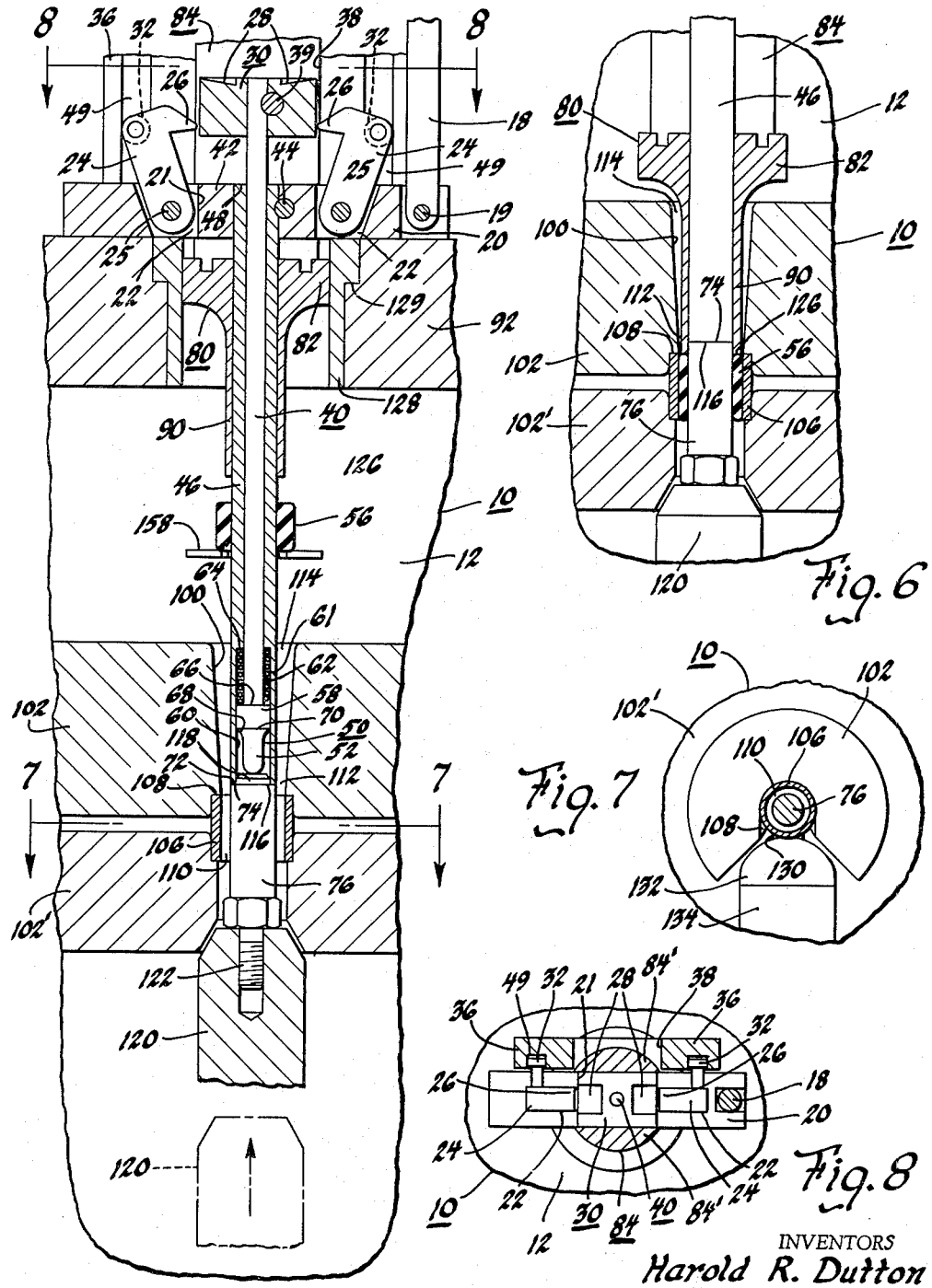

United States Patent Office
2,992,476
Patented July 18, 1961

1

2,992,476
MEANS FOR MOUNTING RESILIENT ANNULAR MEMBERS
Harold R. Dutton and William G. Schwallie, Dayton, Ohio, assignors to General Motors Corporation, Detroit, Mich., a corporation of Delaware
Filed Nov. 22, 1957, Ser. No. 698,101
2 Claims. (Cl. 29—235)

This invention relates to a means for mounting resilient tubular members, and particularly, to an improved method for forcing a resilient grommet or bushing concentrically between inner and outer mounting members.

An object of this invention is to provide an improved means for forcing a resilient annular member concentrically between inner and outer mounting means free of damage to the resilient annular member.

Another object is to provide an improved means for concentrically mounting a resilient grommet having a smaller internal diameter than an external diameter of an inner mounting means and having a greater external diameter than an internal diameter of an outer mounting means.

Another object is to provide a quick and safe means for concentrically mounting a rubber-like bushing having a smaller internal diameter than an external diameter of an internal stud and having a greater external diameter than an internal diameter of an outer ring or sleeve.

Another object is to provide a means for forcing a resilient annular member onto a pilot and over a radially outwardly tapered shoulder therewith onto a sleeve having an outer surface with an edge and blunt end adjacent the tapered shoulder spaced both laterally and longitudinally thereof with subsequent retraction of the pilot into the sleeve as the resilient annular member is forced onto an inner mounting means having an external diameter equal to that of the sleeve and larger than the initial inner diameter of the resilient annular member.

Another object is to provide a means for forcing a resilient annular member onto a pilot and over a radially outwardly tapered shoulder therewith onto a sleeve having an outer surface with an edge and blunt end adjacent the tapered shoulder spaced both laterally and longitudinally thereof with subsequent retraction of the pilot into the sleeve as a resilient annular member is forced onto an inner mounting means having an external diameter equal to that of the sleeve and larger than the initial inner diameter of the resilient annular member while the outer periphery of the resilient annular member is compressed using a ram and funnel means for simultaneously guiding the resilient annular member into an annular outer mounting means having an internal diameter less than the outer diameter of the resilient annular member.

Another object is to provide means including a pilot member having a laterally outwardly tapered shoulder initially spaced longitudinally and laterally of a sleeve having an outer surface with an edge and blunt end over which a resilient annular member is bounced with subsequent retraction of the pilot member into the sleeve as the resilient annular member is forced by a ram mechanism both onto an inner mounting means having the same external diameter as the sleeve but larger than the initial inner diameter of the resilient grommet and also into an outer mounting means using a funnel to squeeze the initially larger outer diameter of the resilient grommet within the confines of a smaller inner diameter of the outer mounting means concentrically about the inner mounting means.

Further objects and advantages of the present invention will be apparent from the following description, reference being had to the accompanying drawings where-

2 in a preferred embodiment of the present invention is clearly shown.

In the drawings:

FIGURE 5 is a cross sectional elevational view of the means of FIGURES 1–4 positioned as during still another step in the method of the present invention.

FIGURE 6 is a fragmentary view of parts in FIGURE 5 illustrating the end result of a final step of the method of the present invention.

FIGURE 7 is a fragmentary cross sectional view taken along line 7—7 of FIGURE 5.

FIGURE 8 is a fragmentary cross sectional view taken along line 8—8 of FIGURE 5.

Figure 1:
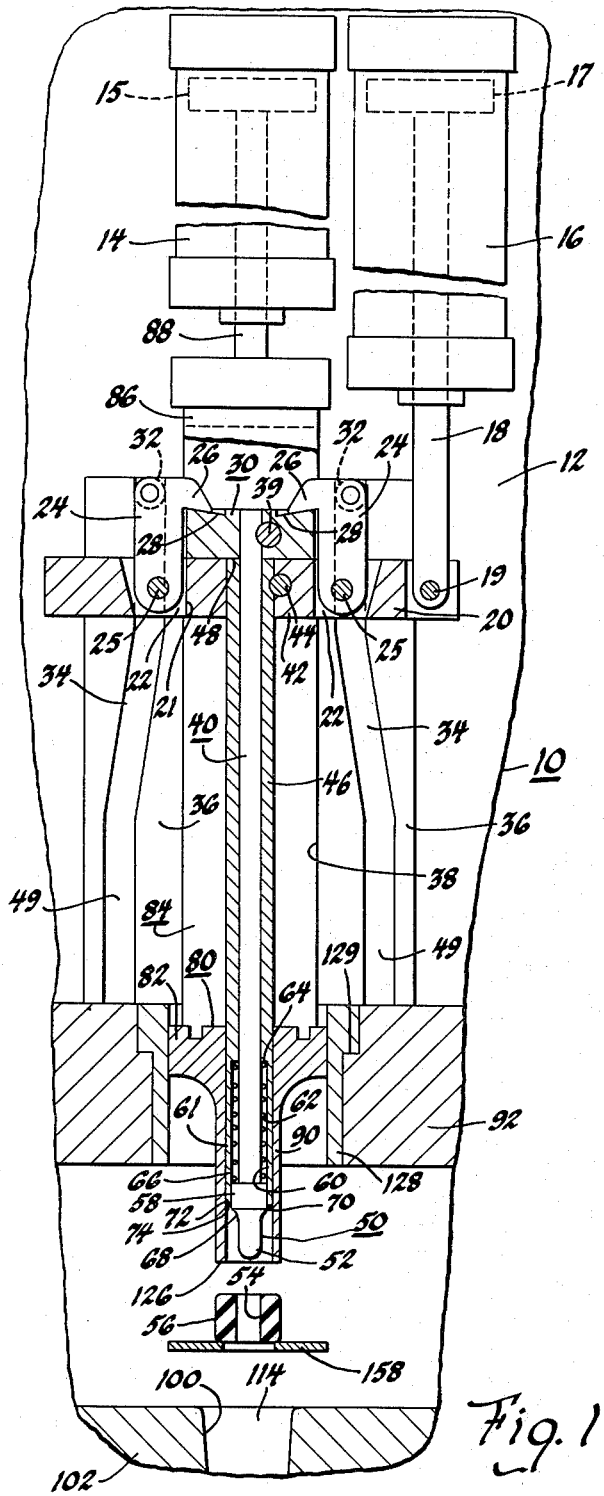
FIGURE 1 is a cross sectional elevational view of means for use in the method of mounting resilient annular members in accordance with the present invention.

With particular reference to FIG. 1, there is shown an apparatus or means generally indicated by numeral 10 for use in the present invention for mounting resilient tubular members concentrically between inner and outer mounting members. The apparatus 10 includes a base or support 12 on which there are mounted a pair of cylindrical housings 14 and 16 each having reciprocable therein pistons 15 and 17 respectively. The pistons or their equivalent are movable through mechanical means such as by a cock spring mechanism or by any suitable fluid actuation as may be effected by hydraulic fluid or gas pressure supplied to the housings 14 and 16 for shifting the pistons in either of opposite directions in a conventional manner. The piston 17 has a rod 18 attached thereto which extends through an opening in the end of the housing 16. The rod 18 is securely fixed by a suitable fastening means such as a dowel or pin 19 to one end or side of a spear driving means or member 20. The spear driving means is provided with a central opening 21 and a recess 22 extending radially outwardly on each side of the central opening 21. A pawl or latch member 24 is pivotally mounted by means of a pin 25 fitted into the driving member 20 so that the pawl is movable in each recess 22.

The pawl or latch member 24 has a tooth portion 26 engageable with a recess 28 formed on each side of a cap member generally indicated by numeral 30. The teeth 26 lock into engagement with the recess 28 of the cap 30 due to a guiding of movement therebetween by rollers 32 mounted on each pawl member. The rollers when positioned as shown in FIGURE 1 are in an upper position relative to a path of travel provided by a cam track 34 formed in a cam guide means 36 symmetrically located relative to a central bore 38. The cap 30 is moved downwardly in the bore 38 when hydraulic fluid or gaseous pressure is supplied to the cylindrical housing 16 for moving piston 17 downwardly causing rod 18 to shift the driving plate 20 downwardly as shown in FIGURE 1. Downward shifting of the plate 20 causes the pawls to also be moved downwardly with the plate due to the pins 25 attaching the pawls to the plate and the rollers 32 follow the path provided by cam track 34 symmetrically on each side of the bore 38. The teeth 26 pull the cap 30 downwardly through the bore and a dowel or pin 39 located between the cap and a rod generally indicated by numeral 40 causes the rod 40 to move downwardly together with the cap and other parts described above. The dowel acts as a key to secure the rod to the cap 30.

A secondary cap 42 is shown abutting against the bottom surface of cap 30 in FIG. 1. The dowel 44 is inserted through the secondary cap 42 to attach and secure a sleeve or annular cylindrical pusher rod 46 to the secondary cap. An upper end 48 of the sleeve abuts against the inner peripheral portion of the bottom surface of cap 30. The rod 40 and sleeve 46 are movable relative to each other whenever the pawl or latch members 24 are disengaged from the cap 30. Disengagement of the pawl members from the cap occurs when the rollers 32 move in the cam track 34 as a result of pivotal movement of each of the pawls about the axis of each of the pins 25 to a position disengaging the tooth portions 26 from the end cap. This disengagement occurs when the rollers travel into a lower portion 49 of the cam tracks 34.

For use in the present invention, the rod 40 is provided at its end remote from the cap 30 with a pilot member or plunger generally indicated by numeral 50. The pilot member has a central pilot or spear nose portion 52 having substantially the same external diameter as the internal diameter 54 of a resilient annular member, bushing, or grommet indicated by numeral 56. The outer surface of the central pilot or spear nose portion 52 is preferably highly polished so as to provide a smooth surface to receive the grommet 56 with a minimum of friction. The pilot member 50 is further provided with a radially outwardly extending shoulder portion 58 having an external diameter larger than the external diameter of the central pilot portion and substantially the same diameter as that of the internal peripheral surface 60 of a lower portion or skirt 61 of the sleeve 46 adjacent to the pilot member 50 and located remote from the cap 30 and secondary cap 42. The shoulder portion 58 also has a larger diameter relative to the diameter of the rod 40 which engages an inner periphery of the sleeve 46. The inner periphery of the sleeve 46 has a smaller diameter than the diameter of the inner surface 60 adjacent the pilot member 50.

A compression spring 62 is fitted between a shoulder 64 provided inside the sleeve 46 and shoulder 58 of the pilot member 50. The purpose of spring 62 is to bias the rod and pilot member downwardly relative to the inner periphery 66 of the lower portion 61. This spring 62 is of sufficient strength to urge the cap 30 into engagement with the secondary cap 42 thereby concentrically locating the rod 40 relative to the sleeve 46 in such a manner that the pilot member 50 protrudes downwardly and extends outwardly from the lower end portion 61 of the sleeve 46 remote from the cap 30 and secondary cap 42. The smooth surface of the central pilot or spear nose portion 52 is provided with a tapered shoulder surface 68 progressing radially outwardly and upwardly from the peripheral surface of the spear nose to an annular edge 70 along the lower periphery of the shoulder portion 58 adjacent to the spear nose. The rod 40 is of a predetermined length such that upon engagement of the lower surface of cap 30 across the upper surface of the secondary cap 42 the edge 70 is spaced longitudinally downwardly and laterally inwardly from the lower and radially outer peripheral edge 72 of a blunt end 74 of skirt or lower end portion of the sleeve 46.

In acocrdance with the present invention, the sleeve 46 has an external diameter which coincides and is coaxial with the annular edge 72 and which is larger than the internal diameter 54 of the grommet 56. The external diameter of the sleeve 46 is substantially equal to the external diameter of an inner mounting means or stud 76 onto which the bushing 56 is to be mounted as shown in FIG. 5.

Figure 2:
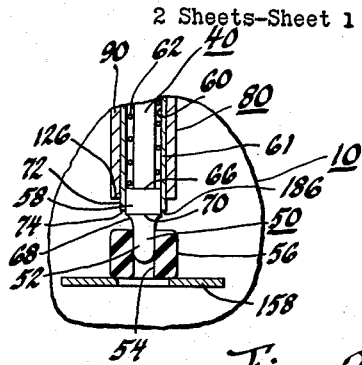
FIGURE 2 is a fragmentary view of parts from FIGURE 1 positioned for one of the steps in the method of the present invention.

FIG. 2 shows the pilot member 50 in a position representing an initial step in the method of the present invention for mounting the resilient bushing 56. The first step includes movement of the pilot member 50 as effected by actuation of the piston 17 and rod 18 to move member 20 carrying pawls 24 latched with cap member 30 engaging cap 42 for driving the sleeve 46 and rod 40 downwardly together to effect initial engagement of the spear nose 52 relative to an inner periphery or surface of the grommet or bushing 56. A bifurcated member 158 can be movably attached to the base 12 in any suitable manner. In any event, the bifurcated member or support 158 must be available to provide a mounting or support for the grommet or bushing 56 during the initial steps in the method of mounting the grommet as represented by the views in FIGURES 1–5.

As the sleeve 46 is moved downwardly, it is guided through a central opening extending longitudinally through a main driver member generally indicated by numeral 80. The driver member 80 has a laterally extending portion 82 to which is attached a connecting means 84. The connecting means 84 is attached at an upper end 86 to a rod 88 which is movable by the piston 15 that reciprocates in cylindrical housing 14. The connecting means 84 has substantially the same outer diameter as the longitudinal passage 38 formed in the guide means 36. The main driver 80 has a downwardly extending portion or reduced diameter external portion 90 which is used in a subsequent step of the method of mounting the resilient annular members in accordance with the present invention.

So long as the pawls or latch members 24 remain engaged with the cap 30, the pilot member 50 and rod 40 are movable together with the sleeve 46 to pick up or spear the grommet 56 onto the central pilot or spear nose portion 52. Any suitable lubricating fluid may be rubbed or coated onto the surface of the grommet 56 or pilot member to facilitate the spearing and sliding of the grommet 56 into the pilot member.

Figure 3:
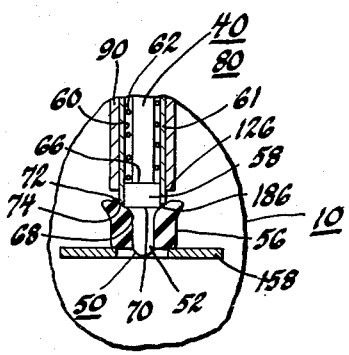
FIGURE 3 is a fragmentary view of the parts of FIGURE 2 positioned for a further step in the method of the present invention.

FIG. 3 represents the next step in the method of mounting the resilient annular member comprising the forcing of the grommet 56 over the tapered surface 68 of the pilot member causing a spreading or radially outwardly extending action of the grommet from its initial smaller internal diameter. The spearing action progresses as the grommet continues to be supported on the bifurcated member 158 and the grommet is forced further outwardly into space beyond the edge 70 at the radial outer periphery of the shoulder portion 58 which coincides with the radially outer end of the taper 68 such that the grommet bounces across a gap 186 visible in FIG. 3 and then the inner periphery of the grommet as expanded comes into engagement with the outer peripheral edge 72 at the blunt end 74 of the sleeve 46.

Figure 4:
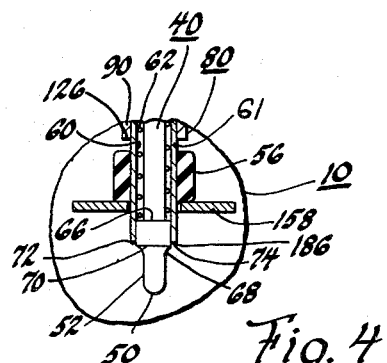
FIGURE 4 is a fragmentary view of parts of FIGURE 2 positioned for another step in the method of the present invention.

The next step in the process of mounting a resilient tubular member concentrically between inner and outer mounting means in the present invention is illustrated in FIG. 4. The bifurcated member 158 continues to support the grommet 56 while the rod 40 and the sleeve 46 continue to move downwardly together so that the grommet 56 is shifted and forced to slide onto the outer periphery of the sleeve 46. This positioning of the grommet 56 with its inner peripheral surface completely in engagement with the outer periphery of the sleeve 46 is clearly visible in FIG. 4. The reduced diameter portion 90 of the main driver member 80 is visible in FIGURES 2, 3, and 4 and up to this time has not been moved from its position as indicated in FIG. 1. The piston 17 continues to actuate the plate 20 downwardly to effect spearing movement of the pilot member and sleeve 46 relative to grommet 56 until the rollers 32 move into the lower portion 49 of the cam track 34 as illustrated in FIG. 5.

FIG. 5 shows how the rollers 32 on the latch member 24 follow the cam track 34 to a lower portion 49 thereof and effect disengagement of the tooth portions 26 of the latch members from the cap 30. This disengagement occurs only after the sleeve 46 has been forced downwardly, appreciably farther than shown in FIG. 4 while the bifurcated member 158 continues to support the grommet. When the grommet has been forced to slide to an intermediate portion on the outer periphery of the sleeve 46, the bifurcated member 158 is retracted or indexed away from sleeve 46 and grommet 56. The rod 18 driven by the piston 17 forces the plate member 20 downwardly until the plate member engages the top of a lateral portion 92 of the support or frame 12. The lateral portion 92 serves as a stop to prevent further downward movement of the plate member 20.

Upon completion of the step of moving the grommet 56 to an intermediate portion of the sleeve 46, the lower portion or skirt 61 of the sleeve 46 extends downwardly into a funnel guide 100 provided extending through a top support or a table 102 for an outer mounting means 106. The outer mounting means is an annular ring or sleeve placed concentrically in a recess 108 of the table 102 and located concentrically relative to an inner mounting means or stud 76. As can be seen in FIG. 5, an annular space 110 between the inner mounting means 76 and the outer mounting means 106 has a lateral thickness appreciably less than the lateral thickness of the grommet 56 located at an intermediate portion of the sleeve 46. The funnel guide 100 has a portion 112 immediately adjacent the top of the inner periphery of the outer mounting means 106 having substantially the same diameter as the diameter of the inner periphery of the outer mounting means 106. The diameter of the funnel guide 100 at a top portion 114 thereof is considerably greater than the external diameter of the grommet 56 when the grommet is positioned as shown in FIG. 5, and thus the funnel guide 100 has a radially inwardly tapering guide surface relative to the inner periphery of the outer mounting means 106.

The stud 76 as shown in FIG. 5 has an external diameter substantially equal to the external diameter of the sleeve 46. The blunt end 74 of the sleeve 46 abuts against a shoulder portion 116 of the stud adjacent to a reduced diameter portion 118 at the end of the stud adjacent to the pilot member 50. The reduced diameter portion 118 has an external diameter substantially equal to the internal diameter of the lower portion 61 of the sleeve 46. A top end of reduced diameter portion 118 engages the central pilot or spear nose 52 of the pilot member and forces the pilot member 50 together with the rod 40 and cap 30 axially upwardly against the force of spring 62 to a position as shown in FIG. 5. The reduced diameter portion 118 can displace the pilot member 50 inside skirt 61 and rod 40 upwardly relative to cap 42 and sleeve 46 as shown in FIG. 5 because the latch members 24 have been disengaged from the cap 30 by the cam guide means as described above. This permits aligning the sleeve 46 at its blunt end 74 against the shoulder 116 of the stud 76. The stud is carried by a support 120 which is movable upwardly in any suitable manner to place the stud 76 in a concentric position relative to the outer mounting means 106. Threads 122 on a portion of the stud remote from the shoulder 116 are provided for attaching the stud to a body such as an automobile frame or chassis and this threaded portion is inserted into a recess provided in support 120. The table can be formed of the top support and a bottom support 102′ which are complementary relative to each other and retain the outer mounting means 106 in recess 108.

As soon as the driving member 20 hits the stop portion 92 of support 12, the sleeve 46, specifically the blunt end 74, has been positioned in abutting relationship with the stud 76, specifically the shoulder 116 such that the grommet 56 along its inner periphery is provided with a smooth sliding surface in a path directly from the outer periphery of the sleeve 46 onto the outer periphery of the stud 76. The main driver member 80 referred to with FIG. 1 is now used to push the grommet downwardly over the outer periphery of the sleeve 46 onto the outer periphery of the stud 76. To permit the main driver 80 and, specifically, the reduced diameter portion 90, to push the grommet 56 downwardly, it is necessary for the bifurcated support member 158 to be movable laterally away from the position indicated in FIGURES 1–5 to remove the support 158 from the path of the laterally extending portion 82 of the driver member 80. The support 158 can be a plate which is supported in any suitable manner on the frame or support 12 by a vertically mounted pivot pin, for example, permitting arcuate swinging movement of the support about a vertical axis away from the sleeve 46 and grommet 56 or by a horizontal pin permitting downward pivotal movement away from sleeve 46 and grommet 56. Since specific mounting for support 158 is not part of the present invention, no particular mounting is shown. FIG. 6 shows the relationship of the stud 76, the grommet 56, and the outer mounting means or ring 106 attained as a result of having the main driver push the grommet downwardly over the outer periphery of the sleeve 46 onto the stud 76 while using the funnel guide 100 to apply a radially inwardly thinning force to fit and forcefully squeeze the bushing or grommet concentrically between the smaller lateral space between the inner and outer mounting means. The funnel is provided with a gradually tapering surface and the bottom portion 90 of the main driver 80 has a blunt end 126 which positively engages the top lateral surface of the grommet 56 for engaging and smoothly sliding the grommet over the surface of the sleeve 46 without damaging any inner or outer surface of the grommet 56. The lateral portion 82 of the main driver 80 is engaged by the connecting means 84 to the rod 88 attached to piston 15 in the main cylinder housing 14 shown in FIG. 1. When hydraulic fluid or gaseous pressure is supplied to the cylinder 14 for moving piston 15, the main driver 80 is forced downwardly in a path which is longitudinal and axial relative to the sleeve 46 and rod 40. The connecting means 84 are guided in this longitudinal and axial path by the central opening 38 in which the connecting means 84 is slidable. Thus the alignment of the main driver 80 is maintained relative to the sleeve 46 as well as relative to a bushing 128 visible in FIGURES 1 and 5. The bushing 128 is fitted with an annular shoulder portion 129 thereof locked into engagement with a recess of the lateral support 92 of frame 12. Connecting means 84 assure concentric and spaced alignment of the driver member relative to sleeve 46 and guide means 36 even when the driver member 80 is moved downwardly free of engagement with bushing 128 of support 92 as represented by FIG. 6.

FIG. 7 shows how the outer mounting means 106 is placed in recess 108 of the top support 102 and lower suport 102′. As shown in FIG. 7, the outer mounting means 106 comprises an eyelet or annular piece attached by a welded juncture 130 to an end cover 132 of a shock absorber 134 partially visible in FIG. 7. The stud 76 can be seen located concentrically within the ring 106 separated therefrom by the annular space 110 into which the grommet 56 is forced as shown in FIG. 6.

FIG. 8 is a cross sectional view taken from FIG. 5 to show the relationship of parts including the driving member 20 with the rod 18 for moving the driving member downwardly while the rollers 32 follow the cam track to a lower portion 49 where the latch members 24 are pivoted about pins 25 to a position out of engagement with the cap 30. The upper end of the rod 40 is visible extending through the top of a cap 30 in FIG. 8. The recesses 28 formed on opposite sides of top surface of the cap 30 are also visible in FIG. 8. The cap is slidable between opposite complementary leg portions 84′ of the connecting means 84 for transmitting downward movement through upper end 86 from rod 88 to the main driver 80 in steps effecting grommet or rubber bushing mounting as described with FIGURES 1 through 5. The leg portions 84' are substantially semicylindrical in cross section as is seen in FIG. 8 and each has an outer semi-annular surface that engages the opening 38 formed inside of the guide means 36 carried by the support 12. Thus the connecting means 84 together with the main driver 80 are movable by the rod 88 completely independent of any movement of the driving member 20, latch members 24, and cap 30 as effected by rod 18.

Summarizing the method and means for mounting resilient annular members in accordance with the present invention, the following steps are involved in the process of fitting a resilient annular member onto a stud having a larger external diameter than the internal diameter of the bushing as well as mounting the stud and bushing concentrically within the confines of outer mounting means, ring or eyelet 106 having an internal diameter less than the outer diameter of the bushing. The method includes placing the grommet 56 on the lateral support 158, moving the rod 40 together with the sleeve 46 downwardly with the pilot member 50 positioned having the tapered surface 68 and annular edge 70 of the shoulder portion of the pilot member spaced longitudinally downwardly from and laterally inwardly of the edge 72 formed at the radial outer periphery of the blunt end 74 of the sleeve 46, forcing or punching the spear nose 52 into the internal opening of the grommet 56 as indicated in FIG. 2, spreading and bouncing the grommet 56 radially outwardly over the tapered surface 68 across the gap 186 and over the edge 72 of the outer surface of sleeve 46 in progressive steps as indicated in FIGURES 3 and 4, sliding the grommet concentrically over the outer surface of sleeve 46 removing the lateral support 158 from beneath the grommet engaging the blunt end 74 of the sleeve 46 against shoulder 116 of the stud 76 thereby concentrically aligning the sleeve 46 longitudinally and axially of the stud 76, forcing the grommet 56 downwardly along the outer surface of the sleeve 46 into the funnel guide 100, squeezing and thinning the grommet 56 between the funnel guide 100 and sleeve 46 into the annular space 110 between the inner mounting means or stud 76 and outer mounting means or shock absorber eyelet 106. The retracting of the pilot member 50 to within the confines of lower portion 61 of the sleeve 46 against the bias of spring 62 is included with the step of pushing the sleeve adjacent to the stud 76 such that the blunt end 74 of the sleeve abuts against the shoulder 116 of the stud.

The advantage of using the process and means for mounting resilient annular members or bushings in accordance with the present invention lies in the fact that the grommet 56 is in no way damaged while being placed under force in the annular space 110 which has a lateral thickness appreciably less than the original lateral thickness of the grommet 56 as illustrated in FIGURES 105. The gap 186 between edge 72 of the blunt end 74 of sleeve 46 is provided to permit spreading of the inner periphery of grommet 56 from an initial small inner diameter expanded during forcing thereof over the tapered surface 68 onto the larger external diameter of the sleeve 46 which is substantially the same diameter as that of the inner mounting means or stud 76. The grommet or bushing passes in an unsupported and flexible condition across the gap 186 which in effect is so located that it provides a continuation of the tapered surface out to the outer edge 72 of the blunt end 74 of sleeve 46. Due to the fact that the bushing is in an unsupported and flexible condition as it is forcefully bounced or projected across the gap 186, there is a natural flexing in the bushing itself for resiliently continuing movement of the bushing as though it were still on the tapered surface and for resiliently engaging the edge 72 of the blunt end 74 at a location along the inner peripheral surface of the bushing as represented in FIG. 3 rather than at an inner peripheral edge of the bushing whereby damage such as tearing or cutting could easily occur. The bushing is readily slidable and movable upwardly and downwardly on both the sleeve and stud once the bouncing action over gap 186 in accordance with the present invention results in expanding the inner diameter of the bushing free of damage such as tearing or cutting.

While the embodiment of the present invention as herein disclosed constitutes a preferred form, it is to be understood that other forms might be adopted.

What is claimed is as follows:

1. A ram means for mounting a resilient tubular member in a position concentrically between an inner stud having an external diameter greater than an initial inner diameter of the tubular member in a free state and an outer ring having an internal diameter smaller than an initial outer diameter of the tubular member with the inner diameter of the tubular member expanded to the external diameter of the stud, comprising, a base for support of ram means components including the following, a cam guide means mounted on said base relative to which a longitudinally and laterally variable path of travel is provided, a power actuated plate member longitudinally movable relative to said cam guide means between opposite ends thereof, pawl means pivotally carried by said plate member and adapted for following the path of said cam guide means, a rod having a cap portion near one end of the path of said cam guide means, a sleeve member positioned on said rod within which said rod is slidable and having a smooth cylindrical outer surface and engageable at one end thereof against the cap portion of said rod, a pilot member in the shape of a spear nose provided at a rod end remote from the cap portion and adapted for initial engagement with the inner periphery of a tubular member as well as adapted to telescope and fit into space inside said sleeve member in a retracted position, a radially outwardly tapering annular surface terminating as an annular shoulder integral with said spear nose of said pilot member, said nose having an external diameter substantially equal to the inner diameter of the tubular member to be mounted, a power actuated main driver means concentric with and longitudinally movable over the outer smooth and cylindrical surface of said sleeve member, said pawl means in transversing part of the path of said cam guide means having a securing relation to said cap portion such that said sleeve member at a blunt end remote from said cap portion has an annular edge spaced longitudinally away and laterally outwardly from said tapered surface shoulder so as to define a space gap therebetween, said sleeve member and rod fastened thereto by said pawl means in a condition providing the gap between said tapered surface and annular edge being adapted to be driven by movement of said plate member and pawl means such that a tubular member to be mounted is forced over the nose portion and tapered surface from which an inner periphery of the tubular member passes momentarily free of internal support across said space gap to a location over the blunt end and annular edge of said sleeve member onto the smooth-cylindrical outer surface of said sleeve member, said pawl means becoming laterally disengaged from force transmitting relation with said cap portion as another part of the path of said cam guide means is traversed whereby said nose portion is retracted to abut against a stud and is telescoped into space inside said sleeve member with the blunt end of the sleeve member against the stud to provide thereby a continuous cylindrical surface formed by the stud and said sleeve member, table means for supporting the stud and ring in concentric axial and radially spaced alignment on said base, a funnel guide carried by said base in a location axially in alignment with both the stud and ring as well as said sleeve member and longitudinally to one side of as well as radially outside said sleeve member upon disengagement of said pawl means from said cap portion, and a support means on said base in a location initially in between said funnel guide and nose portion in axial alignment therebetween from which the tubular member is removed by actuation of said plate member to provide for transmittal of axial movement to said rod and said sleeve member by way of said pawl means, said main driver means transmitting force to the tubular member to slide the same over the continuous outer smooth and cylindrical surface provided jointly by the stud and said sleeve member while said funnel guide located radially outside said sleeve member effects radially inwardly compression of the tubular member to fit concentrically in an annular space between the concentric stud and ring.

2. The ram means of claim 1 in which there is a spring means provided between the shoulder of said pilot member and said sleeve member, said pilot member being adapted to be engaged by one end of the stud as the pawl means are disengaged from the cap portion and said pilot member is retracted to a position inside said sleeve member wherein there is eliminated the gap across which the resilient tubular member is bounced and projected onto said sleeve member, said spring means tending to urge said pilot member to a position relative to said sleeve member for providing the gap during engagement of the pawl means relative to the cap portion of said rod by which said pilot member is carried.

References Cited in the file of this patent

UNITED STATES PATENTS

| | | |
|---|---|---|
| 2,263,815 | Northup et al. | Nov. 25, 1941 |
| 2,763,055 | Hardy | Sept. 18, 1956 |
| 2,930,640 | Davis et al. | Mar. 29, 1960 |

FOREIGN PATENTS

| | | |
|---|---|---|
| 758,295 | Great Britain | Oct. 3, 1956 |